US008687558B2

(12) United States Patent  
Jackson et al.

(10) Patent No.: US 8,687,558 B2  
(45) Date of Patent: Apr. 1, 2014

(54) METHODS AND APPARATUS TO ROUTE EMERGENCY COMMUNICATION SESSIONS (75) Inventors: James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/354,084

(22) Filed: Jan. 19, 2012

(65) Prior Publication Data

US 2012/0113901 A1 May 10, 2012

Related U.S. Application Data (63) Continuation of application No. 11/855,837, filed on Sep. 14, 2007, now Pat. No. 8,130,663.

(51) Int. Cl.  
*H04W 4/00* (2009.01)

(52) U.S. Cl.  
USPC ............... 370/328; 370/338; 370/400

(58) Field of Classification Search  
CPC ..... H04W 4/22; H04W 76/007; H04M 11/04; H04M 1/72505; H04M 1/72522  
See application file for complete search history.

(56) References Cited

U.S. PATENT DOCUMENTS

| | | | |
|---|---|---|---|
| 6,256,489 B1 | 7/2001 | Lichter et al. | |
| 6,990,328 B2 | 1/2006 | Crandall et al. | |
| 7,215,638 B1 | 5/2007 | Roberts et al. | |
| 7,221,928 B2 | 5/2007 | Laird et al. | |
| 7,856,001 B2 | 12/2010 | Hares et al. | |
| 2005/0048947 A1 | 3/2005 | Holland et al. | |
| 2005/0090225 A1 | 4/2005 | Muehleisen et al. | |
| 2005/0117566 A1 | 6/2005 | Davidson | |
| 2006/0056456 A1* | 3/2006 | Ratiu et al. | 370/474 |
| 2006/0114881 A1* | 6/2006 | Chari et al. | 370/351 |
| 2006/0215581 A1 | 9/2006 | Castagnoli | |
| 2006/0268902 A1 | 11/2006 | Bonner | |
| 2006/0286984 A1 | 12/2006 | Bonner | |
| 2007/0008885 A1 | 1/2007 | Bonner | |
| 2007/0049245 A1 | 3/2007 | Lipman | |
| 2007/0142028 A1 | 6/2007 | Ayoub et al. | |
| 2007/0153771 A1 | 7/2007 | Doradla et al. | |
| 2007/0153982 A1 | 7/2007 | Bloebaum et al. | |
| 2007/0153983 A1 | 7/2007 | Bloebaum et al. | |
| 2007/0153984 A1 | 7/2007 | Bloebaum et al. | |
| 2007/0153986 A1 | 7/2007 | Bloebaum et al. | |
| 2007/0160028 A1 | 7/2007 | Hein-Magnussen et al. | |
| 2007/0160034 A1 | 7/2007 | Koretsky | |
| 2008/0009262 A1* | 1/2008 | Rudolf et al. | 455/404.1 |

\* cited by examiner

*Primary Examiner* — Jung Park  
(74) *Attorney, Agent, or Firm* — Hanley, Flight and Zimmerman, LLC (57) ABSTRACT

Methods and apparatus to route emergency communication sessions are disclosed. An example method involves querying a gateway node cache in response to a first broadcast probe received at a node of a wireless Internet-based network. When the gateway node cache identifies a first gateway node, a first response is selectively sent to nodes that participated in a search flood associated with the first broadcast probe.

18 Claims, 6 Drawing Sheets

METHODS AND APPARATUS TO ROUTE EMERGENCY COMMUNICATION SESSIONS

PRIORITY APPLICATIONS

This patent arises from a continuation of U.S. patent application Ser. No. 11/855,837, filed Sep. 14, 2007, now U.S. Pat. No. 8,130,663, which is hereby incorporated herein by reference in its entirety.

FIELD OF THE DISCLOSURE

This disclosure relates generally to multi-mode communication devices and, more particularly, to methods and apparatus to route an emergency communication session for a multi-mode communication device.

BACKGROUND

Many users utilize communication devices (e.g., a cellular phone, a smart phone, a personal digital assistant (PDA), etc.) that are capable of accessing (simultaneously and/or at different times) more than one communication service, for example, a cellular communication service and a wireless Internet-based communication service (e.g., a voice over Internet protocol (VoIP) service accessed via a wireless local area network (WLAN)). Such multi-mode devices provide users greater flexibility in accessing communication services, and/or broader and/or larger numbers of geographic areas from which communication services may be accessed.

DETAILED DESCRIPTION

Methods and apparatus to route an emergency communication session for a multi-mode communication device are disclosed. A disclosed example method includes detecting a call initiation at a user device, determining whether the user device is communicatively coupled to a cellular communication network, and initiating a mesh network routing algorithm at the user device to establish a communication session from the user device to a gateway node via a wireless Internet-based network when the user device is not communicatively coupled to the cellular communication network.

Another disclosed example methods includes receiving a first broadcast probe packet at a node of a wireless Internet-based network, querying a gateway node cache in response to the first probe packet, and broadcasting a first response packet when the gateway node cache identifies a first gateway node.

Yet another disclosed example method includes receiving a call setup request from a first node of an Internet-based network at a second node of the Internet-based network, comparing a first media access control (MAC) address of the call setup request with a second MAC address associated with the second node, querying a cache to obtain a third MAC address when the first MAC address matches the second MAC address, and transmitting a second call setup request to the third MAC address.

A disclosed example device of a cellular communication network includes an emergency call origination detector to detect a call initiation, a cellular transceiver to determine whether the user device is communicatively coupled to the cellular communication network, and a probe packet module to search for a communication path from the user device to a gateway node via a mesh wireless network when the user device is not communicatively coupled to the cellular communication network.

A disclosed example device of a wireless local area network comprises a probe packet module to receive a first broadcast probe packet and to query a gateway node cache in response to the first probe packet, and a report packet module to broadcast a first response packet when the gateway node cache identifies a first gateway node.

A disclosed example communication system includes a first wireless device capable to communicate with a cellular communication network and a mesh wireless local area network (WLAN), and a second wireless device of the mesh WLAN to facilitate an emergency call between the first wireless device and an emergency call center, the second wireless device to identify itself to the first wireless device in response to a probe packet.

In the interest of brevity and clarity, throughout the following disclosure references will be made to the example wireless communication system of FIG. 1. Moreover, the following disclosure will be made with respect to wireless local area network (WLAN) communication technologies and cellular technologies. However, it should be understood that the methods and apparatus described herein to route emergency communication sessions are applicable to other communication technologies, communication systems and/or communication networks, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

Figure 1:
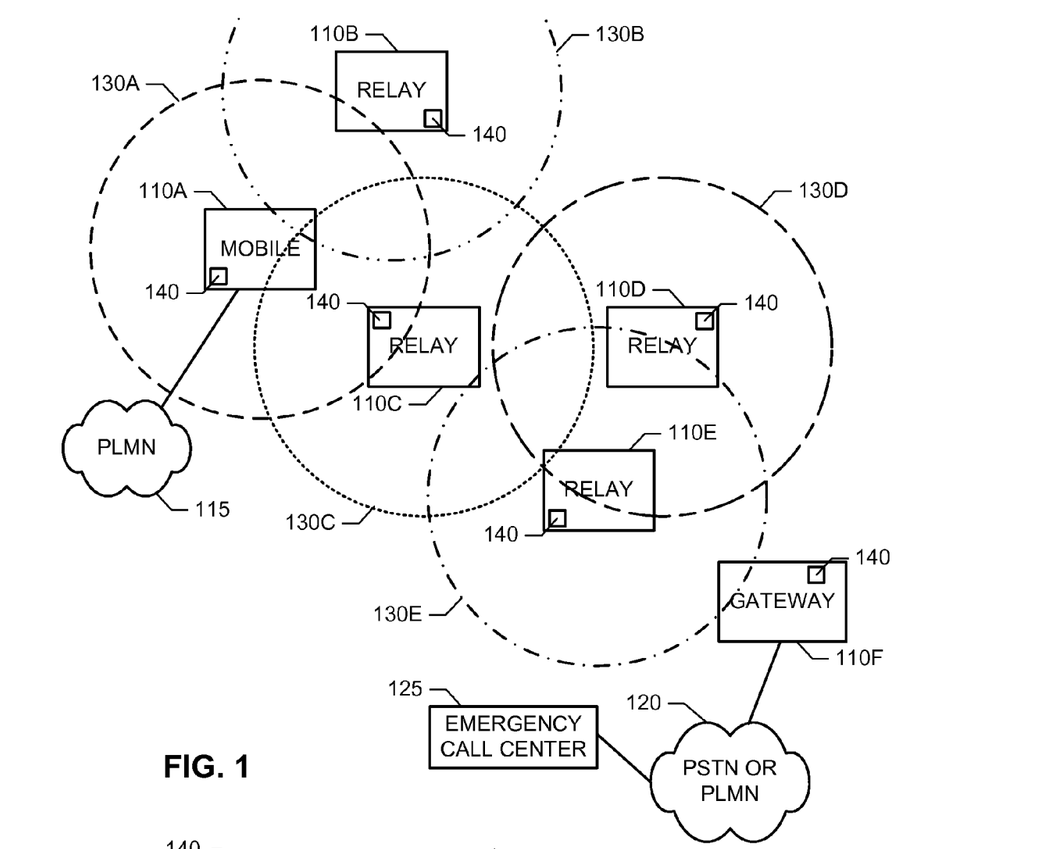
FIG. 1 is a schematic illustration of an example communication system constructed in accordance with the teachings of the disclosure.

FIG. 1 is a schematic diagram of an example wireless communication system. To provide wireless data and/or communication services (e.g., telephone services, Internet services, data services, messaging services, instant messaging services, electronic mail (email) services, chat services, video services, audio services, gaming services, etc.), the example wireless communication system of FIG. 1 includes any type(s) and/or number of fixed-location, substantially fixed-location and/or mobile wireless devices, six of which are respectively designated in FIG. 1 with reference numerals 110A, 110B, 110C, 110D, 110E and 110F. Example wireless devices 110A-F include, but are not limited to, user devices such as a personal digital assistant (PDA), an MP3 player such as an iPod®, a wireless telephone (e.g., a cellular phone, a voice over Internet Protocol (VoIP) phone, a smart phone, etc.), a laptop computer with wireless communication capabilities, a personal computer (PC) with wireless communication capabilities, etc., and/or network devices such as wireless access points, wireless base stations, residential gateways, wireless routers, wireless hubs, wireless switches, etc. The example wireless devices 110A-F of FIG. 1 are implemented in accordance with one or more standards from the Institute of Electrical and Electronics Engineers (IEEE) 802.11 family of standards. In general, the IEEE 802.11x family of standards collectively encompass a wide range of physical layer technologies, media access control (MAC) protocols, and data frame formats for wireless Internet, wireless Internet Protocol (IP), and/or WLAN based networks and/or communication systems.

The example wireless devices 110A-F of FIG. 1 are arranged and/or communicatively coupled to collectively implement a so-called "mesh wireless network." However, one or more of the wireless devices 110A-F may, additionally or alternatively, be communicatively coupled to a wireless access point and/or wireless base station. Mesh and/or peer-to-peer networking within a wireless network and/or system is substantially different from peer-to-peer networking within a wired network and/or system. In a wired network all nodes are able to transmit data, packets and/or frames to each other, and the traffic is generally unicasted between peers. In a wireless network, nodes 110A-F are only able to transmit data, packets and/or frames to other nodes 110A-F within their signal scope (e.g., as depicted by circles 130A-F associated with respective ones of the example wireless devices 110A-F of FIG. 1), and the traffic is broadcasted between the peers 110A-F. In general, a first wireless device that falls within the signal scope of a second wireless device (e.g., the example wireless device 110B that falls at least partially within the example signal scope 130A associated with the wireless device 110A) is able to receive data, packets and/or frames transmitted by the second wireless device. Even though the medium of a wireless network is a broadcast medium, data, packets and/or frames may be addressed and/or destined for a unicast, multicast, or broadcast MAC address, which specifies to which device(s) 110A-F the data, packets and/or frames are intended. Moreover, in a wireless environment, it is common for some links to be and/or become unacceptable due to weak signal strength between nodes 110A-F, interference, etc. Furthermore, there may be additional concerns for mobile devices 110A-F regarding power (battery life), mobility, limited processing capabilities, and/or limited bandwidth.

One or more of the example wireless devices 110A-F of FIG. 1 may be a multi-mode communication device. A multi-mode communication device is a device that is capable of and/or configurable to communicate using and/or in accordance with two or more communication technologies and/or communication networks, simultaneously and/or at different times. For instance, the example wireless device 110A is capable of communicating with a PLMN 115 using cellular communication technologies and one or more of the other wireless devices 110B-F via WLAN technologies. Likewise, the example wireless device 110F is capable of communicating with a PSTN and/or a PLMN 120 and one or more of the other wireless devices 110A-E via WLAN technologies.

A device (e.g., the example wireless device 110F) that is currently and/or actively communicatively coupled to other wireless devices of a wireless mesh network (e.g., the wireless devices 110A-E) and to a PLMN and/or PSTN (e.g., the example PSTN/PLMN 120) may operate and/or implement one or more gateway functions. As described below, an example gateway function allows other wireless devices (e.g., the wireless device 110A) to become communicatively coupled to a device (e.g., an emergency call center 125) associated with and/or coupled to the example PSTN/PLMN 120 even when such a wireless device is not currently, directly and/or actively able to communicate with a PSTN and/or PLMN (e.g., the example PLMN 115). Gateway functions may be implemented to, for example, facilitate a voice call via a cellular network, a voice call via the Internet, a short message service (SMS) message via a cellular network, and/or a SMS message via the Internet Traditionally, when an emergency communication session is initiated at a communication device, the communication device communicates with an associated PLMN and/or PSTN to request and/or establish the requested emergency communication session to an emergency call center. However, when a traditional communication device is not currently and/or active able to communicate with a PLMN and/or PSTN (e.g., during and/or after a natural and/or man-made disaster and/or emergency when PLMN and/or PSTN equipment and/or communication paths are overloaded, have failed and/or have been damaged), the traditional communication device is unable to request and/or established the requested emergency communication session. Such an inability to establish emergency communication sessions may create public safety hazards for PSTN and/or PLMN service subscribers who assumed that their communication device would be available and/or functional during such disasters and/or emergencies.

The illustrated example system of FIG. 1 addresses such circumstances. In particular, when a user of the example wireless device 110A of FIG. 1 initiates a communication session (e.g., an emergency call to the example emergency call center 125) during a time when the wireless device 110A is not currently able to communicate with its associated PLMN 115, the example wireless device 110A initiates an ad-hoc wireless mesh network routing algorithm to identify a gateway (e.g., the example wireless device 110F) via which the emergency call can be established. As described more fully below, the ad-hoc wireless mesh routing algorithm initiated by the wireless device 110A allows the wireless device 110A to initiate the emergency call to the emergency call center 125 via a wireless device 110F that acts as a gateway node for the emergency call and one or more intervening wireless devices 110B-E that act as relay nodes. A relay node relays messages, data, frames and/or packets between an originating node and a gateway node. In the illustrated example of FIG. 1, a wireless device 110A-F may serve as an initiating node, a relay node, a gateway node and/or an uninvolved node depending upon its communicative position relative to a particular requested communication session. For example, the wireless device 110C may act as a relay node for an emergency call initiated at the wireless device 110A and may, additionally or alternatively, act as an initiating node for an emergency call initiated at the wireless device 110C.

To carry out an ad-hoc wireless mesh routing algorithm to identify a gateway for an emergency call, each of the example wireless devices 110A-F of FIG. 1 include an emergency-net module 140. While each of the wireless devices 110A-F of FIG. 1 include an emergency-net module 140, not all wireless devices of a wireless communication system need to include and/or implement an emergency-net module 140. Such wireless devices (i.e., those without emergency-net modules 140) would simply ignore the example probe and report packets described below, and not participate in the establishment of an emergency call via a gateway node. Each of the example emergency-net modules 140 of FIG. 1 is capable of acting as an initiating node, a relay node, a gateway node and/or an uninvolved node. Example manners of implementing any or all of the example emergency-net modules 140 of FIG. 1 are described below in connection with FIGS. 2-4.

An ad-hoc wireless mesh network routing algorithm that may be used by the example wireless communication system of FIG. 1 to identify a gateway node for an emergency call is a flood-based search in which the scope of the search is bounded by a hop count, such as a time-to-live (TTL) value. To initiate the search, the emergency-net module 140 of an initiating node broadcasts a probe packet containing a unique search identifier to a reserved multicast MAC address. Rather than blindly and/or fully flooding the probe packet to the maximum specified TTL, the example search algorithm implemented by the wireless system of FIG. 1 automatically terminates once a gateway node is identified. When the gateway node is identified, the emergency-net module 140 of the identified gateway node broadcasts its presence using a response and/or report packet within substantially the same scope as that used for the initial search. That is, only those nodes (e.g., emergency-net modules 140) that participated in the search flood participate in the response flood. Emergency-net modules 140 that participated in the search flood and the subsequent response flood, store the emergency-net search results in a gateway cache. The gateway cache identifies, at each node, the next node of a communication path that eventually terminates at a gateway node. When a message, data, frame and/or packet for an emergency call is received at a node, the emergency-net module 140 of that node queries its gateway cache to identify a next emergency-net node (relay and/or gateway), and then forwards the message, data, frame and/or packet to the next node. Moreover, when a probe packet is received at a node, its emergency-net module 140 queries its gateway cache to determine whether a potential gateway node has been previously identified. If a potential gateway node is identified in its gateway cache, the emergency-net module 140 broadcasts a report packet within the same scope via which it received the probe packet. Example machine accessible instructions that may be carried out by, for example, the example processor 225 of FIG. 2 to implement the example emergency-net modules 140 of FIG. 1 are described below in connection with FIGS. 5, 6A, 6B, 7 and 8.

The example ad-hoc wireless mesh network routing algorithm used by the example wireless communication system of FIG. 1 may, in some examples, be further enhanced by using multiple classes of nodes. For example, there may be Class 1 Emergency Relay Nodes/Emergency Gateway Nodes and there may be Class 2 Emergency Relay Nodes/Emergency Gateway Nodes. The originating Mobile Terminal may first perform a Class 1 search, and if that fails, subsequently perform a Class 2 search. Classes may be distinguished by, for example, known thresholds on parameters such as power, cellular signal strength, wireless Ethernet signal strength of sending node, reliability, mobility, and/or location determination capabilities such as a global position system (GPS) receiver. Each device determines whether it is a class 1 and/or a class 2 device based on one or more known thresholds. Moreover, a class 1 device is considered superior and/or preferable to a class 2 device. Further, a device may be "class 1/class 2" or it can be "class 2 only."

Several aspects of the example routing algorithm described herein are intended to limit intentional, incidental and/or accidental performance degradation of the example wireless network of FIG. 1. First, the use of a gateway cache by the emergency-net modules 140 limits the number and/or scope of searches that need to be performed within a particular geographic area. Second, the emergency-net modules 140 may be configured with a maximum allowable TTL for use during search and/or response floods. Third, terminating a search as soon as a gateway node is identified limits the wireless network bandwidth used to perform the search. Fourth, only emergency-net modules 140 that have a valid gateway cache will process emergency call setup requests. Fifth, while search and response packets are broadcast and/or transmitted to a reserved multicast MAC address, call setup requests are sent to the specific unicast MAC address of the next hop. Sixth, the wireless devices 110A-F may reserve and/or allocate a specific amount of their processing capacity for use by the emergency-net module 140 to process search and response packets, and/or to handle emergency call setup packets.

Figure 2:
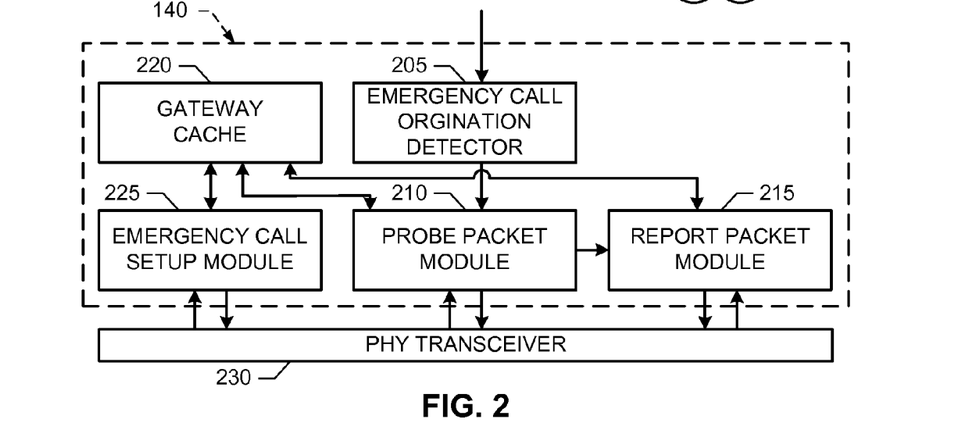
FIG. 2 illustrates an example manner of implementing any or all of the example emergency-net modules of FIG. 1.

FIG. 2 illustrates an example manner of implementing any or all of the example emergency-net modules 140 of FIG. 1. To detect an initiation of an emergency call, the example emergency-net module 140 of FIG. 2 includes an emergency call origination detector 205. The example emergency call origination detector 205 of FIG. 2 determines when an emergency call has been initiated by a user (e.g., by dialing 9-1-1). When an emergency call has been initiated, the example emergency call origination detector 205 determines whether the wireless device that implements and/or includes the emergency call origination detector 205 is currently coupled to a PLMN and/or PSTN. When the wireless device is communicatively coupled to a PLMN/PSTN, the emergency call origination detector 205 initiates the requested emergency call via the PLMN/PSTN. When the wireless device is not currently communicatively couple to a PLMN/PSTN, the example emergency call origination detector 205 initiates the identification of a gateway node (e.g., the example wireless node 110F of FIG. 1) via a probe packet module 210.

To initiate a search to identify a gateway node (e.g., the example wireless node 110F of FIG. 1) when an emergency call is initiated, the example emergency-net module 140 of FIG. 2 includes the example probe packet module 210. The example probe packet module 210 of FIG. 2 broadcasts a probe packet to a reserved multicast MAC address. The broadcasted probe packet contains a TTL value that limits the scope of the search. As described below in connection with the example machine accessible instructions of FIGS. 6A and 6B, the example probe packet module 210 of FIG. 2 also receives, processes and/or responds to probe packets broadcast by emergency-net modules 140 of other wireless devices. If a search fails to identify a gateway node, the example probe packet module 210 may re-initiate the search using a larger TTL value.

To process gateway node search report packets, the example emergency-net module 140 of FIG. 2 includes a report packet module 215. As described below in connection with the example machine accessible instructions of FIGS. 6A and 6B the example report packet module 215 listens for report packets. When a report packet is received for a search in which the emergency-net module 140 participated, the example report packet module 215 updates and/or stores communication path information (e.g., a MAC address for a next hop wireless node) in its gateway cache 220. The report packet module 215 also broadcasts the received report packet to facilitate propagation of the report packet back to the initiating wireless node (e.g., the example wireless node 110A of FIG. 1).

The example gateway cache 220 of FIG. 2 stores one or more entries that each contain a MAC address corresponding to a next-hop of a wireless communication path to a particular gateway node. Since a wireless node may be able to function as a gateway node during one time period but not during another time period, each of the entries of the gateway cache 220 has an associated expiration time and/or date. At the specified expiration time and/or date, the associated cache entry is removed, deleted and/or marked as inactive.

To setup an emergency call, the example emergency-net module 140 of FIG. 2 includes an emergency call setup module 225. When a report packet has been received at an initiating node in response to a probe packet transmitted by the example probe packet module 210, the example emergency call setup module 225 of FIG. 2 transmits a call setup request (e.g., a SIP INVITE message) to the unicast MAC address specified in the received report packet. The example emergency call setup module 225 then establishes the requested emergency call using any applicable past, present and/or future call setup method(s), algorithm(s), message(s) and/or protocol(s) via the identified gateway node.

Figure 3:
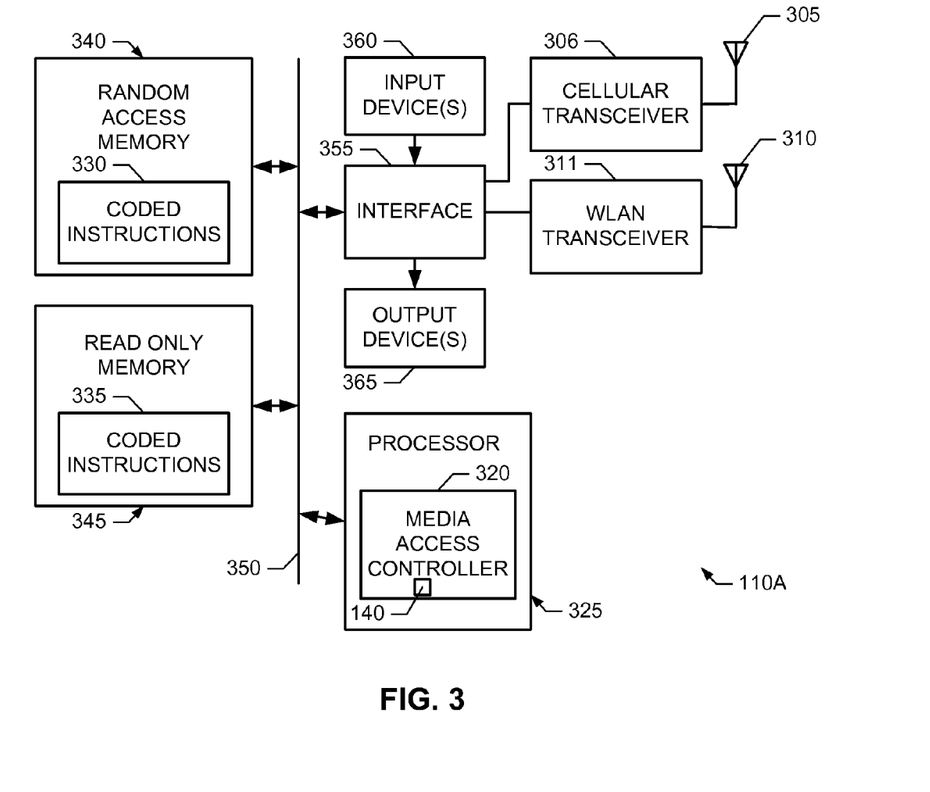
FIG. 3 illustrates an example apparatus that may be used and/or programmed to carry out the example machine accessible instructions of FIGS. 5, 6A, 6B, 7 and/or 8 to implement any of all of the example emergency-net modules and/or the example media access controllers described herein.

To transmit and/or receive probe packets, report packets and/or call setup request messages, each of the example probe packet module 210, the example report packet module 215 and the example emergency call setup module 225 include an interface to a physical layer (PHY) transceiver 230 (e.g., example WLAN transceiver 311 of FIG. 3). While the example modules 210, 215 and 225 of FIG. 2 transmit and/or receive via the example PHY transceiver 230, for ease of discussion, the following disclosure describes the modules 210, 215 and/or 225 as transmitting, broadcasting and/or receiving. However, it will be understood that such transmissions, broadcasts and/or receptions occur via the PHY transceiver 230.

While an example manner of implementing any or all of the example emergency-net modules 140 of FIG. 1 is illustrated in FIG. 2, the emergency-net modules 140 may be implemented using any other and/or additional element(s), processor(s), device(s), component(s), circuit(s), module(s), interface(s), etc. Further, the element(s), processor(s), device(s), component(s), circuit(s), module(s), element(s), interface(s), etc. illustrated in FIG. 2 may be combined, divided, re-arranged, eliminated and/or implemented in any other way. Additionally, the example emergency call origination detector 205, the example probe packet module 210, the example report packet module 215, the example gateway cache 220, the example emergency call setup module 225 and/or, more generally, the example emergency-net module 140 of FIG. 2 may be implemented as any combination of firmware, software, logic and/or hardware. Moreover, the example emergency-net module 140 may include processor(s), device(s), component(s), circuit(s), interface(s) and/or module(s) instead of, or in addition to, those illustrated in FIG. 2 and/or may include more than one of any or all of the illustrated processor(s), device(s), component(s), circuit(s), interface(s) and/or module(s).

FIG. 3 illustrates an example manner of implementing any or all of the example wireless devices 110A-F of FIG. 1. While any of the wireless devices 110A-F may be represented by FIG. 3, for ease of discussion, the example device of FIG. 3 is referred to a wireless device 110A. To support cellular communications, the example wireless device 110A of FIG. 3 includes any type of radio frequency (RF) antenna 305 and any type of physical-layer cellular transceiver 306. The example RF antenna 305 and the example cellular transceiver 306 of FIG. 3 are able to receive, demodulate and decode cellular signals transmitted by and/or within the example PLMN 115 and/or the example PLMN 120. Likewise, the cellular transceiver 306 and the RF antenna 305 are able to encode, modulate and transmit cellular signals to and/or within the PLMN 115 and/or 120. Thus, as commonly referred to in the industry, the example RF antenna 305 and the example cellular transceiver 306 collectively implement the "physical layer" (PHY) for a cellular device.

To support WLAN communications, the example wireless device 110A of FIG. 3 includes any type of RF antenna 310 and any type of physical-layer WLAN transceiver 311. The example RF antenna 310 and the example WLAN transceiver 311 of FIG. 3 are able to receive, demodulate and decode WLAN signals transmitted by other WLAN devices. Likewise, the WLAN transceiver 311 and the RF antenna 310 are able to encode, modulate and transmit WLAN signals to other WLAN devices. Thus, as commonly referred to in the industry, the example RF antenna 310 and the example WLAN transceiver 311 collectively implement the PHY for a WLAN device. In some examples, the RF antennas 305 and 310 may be implemented using a single RF antenna. Moreover, the example cellular transceiver 306 and the example WLAN transceiver 310 may be implemented by a multi-mode transceiver capable of transmitting and/or receiving cellular and WLAN signals.

Figure 4:
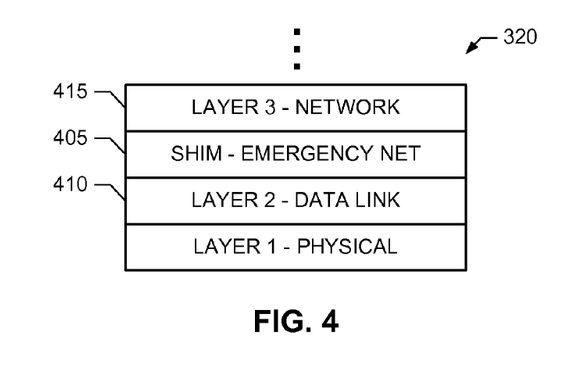
FIG. 4 illustrates an example manner of implementing the example media access controller of FIG. 3.

To provide media access controller (MAC) functionality, the example wireless device 110A of FIG. 3 includes a MAC 320. In addition to MAC functions, the example MAC 320 of FIG. 3 implements and/or includes any of the example emergency-net modules 140 of FIGS. 1 and/or 2. As illustrated in FIG. 4, the example MAC 320 may be implemented as set of protocol layers (e.g., as specified by the open system interconnection (OSI) basic reference model). The example emergency-net module 140 of FIG. 4 is implemented as a so-called "shim" layer 405 between a data link layer 410 and a network layer 415.

Returning to FIG. 3, to implement the example MAC 320 using any number and/or type(s) of software, firmware, processing thread(s) and/or subroutine(s), the example wireless device 110A of FIG. 3 includes a processor 325. The example processor 325 of FIG. 3 may be one or more of any type(s) of processors such as, for example, a microprocessor, a microcontroller, a digital signal processor (DSP), an advanced reduced instruction set computing (RISC) machine (ARM) processor, etc. The example processor 325 executes coded instructions 330 and/or 335, which may be present in a main memory of the processor 325 (e.g., within a random-access memory (RAM) 340 and/or a read-only memory (ROM) 345) and/or within an on-board memory of the processor 325. The example processor 325 may carry out, among other things, the example machine accessible instructions illustrated in FIGS. 5, 6A, 6B, 7 and/or 8 to implement the example MAC 320 and/or the example emergency-net module 140.

While in the illustrated example of FIG. 3, the example MAC 320 and/or the emergency-net module 140 are implemented by executing any number and/or type(s) of software, firmware, processing thread(s) and/or subroutine(s) 335 and/or 330 with the example processor 325, the example MAC 320 and/or the example emergency-net module 140 of FIGS. 3 and/or 4 may be, additionally or alternatively, implemented using any number and/or type(s) of application specific integrated circuit(s) (ASIC(s)), programmable logic device(s) (PLD(s)), field programmable logic device(s) (FPLD(s)), discrete logic, hardware, firmware, etc. Also, some or all of the example MAC 320 and/or the example emergency-net module 140 may be implemented manually or as any combination of any of the foregoing techniques, for example, using any combination of firmware, software and/or hardware.

The example processor 325 of FIG. 3 is in communication with the main memory (including the RAM 340 and the ROM 345) via a bus 350. The example RAM 340 may be implemented by dynamic RAM (DRAM), synchronous DRAM (SDRAM), and/or any other type(s) of RAM devices. The example ROM 345 may be implemented by flash memory and/or any other desired type(s) of memory(-ies) and/or memory device(s). Access to the memories 340 and 345 is controlled by a memory controller (not shown). The RAM 340 may be used, for example, to implement the example gateway cache 220 of FIG. 2.

The example wireless device 110A of FIG. 3 also includes any number and/or type(s) of interface circuits 355. The example interface circuit 355 of FIG. 3 may implement any type(s) of interfaces, such as external memory interface(s), serial port(s), general purpose input/output port(s), etc. Additionally or alternatively, the interface circuit 355 may communicatively couple the example cellular transceiver 306 and/or the example WLAN transceiver with the processor 325 and/or the example MAC 320.

In the illustrated example of FIG. 3, any number and/or type(s) of input devices 360 and any number and/or type(s) of output devices 365 are connected to the interface circuit 355. Example input devices 360 include a keyboard, touchpad, buttons and/or keypads, etc. Example output devices 365 include a display (e.g., a liquid crystal display (LCD)), a screen, a light emitting diode (LED), etc.

While an example manner of implementing any or all of the example wireless devices 110A-F of FIG. 1 is illustrated in FIG. 3, a wireless device 110A-F may be implemented using any other and/or additional element(s), processor(s), device (s), component(s), circuit(s), module(s), interface(s), etc. Further, the element(s), processor(s), device(s), component (s), circuit(s), module(s), element(s), interface(s), etc. illustrated in FIG. 3 may be combined, divided, re-arranged, eliminated and/or implemented in any other of way. Additionally, the example interface 355, the example cellular transceiver 310, the example WLAN transceiver 311, the example MAC 320, the example emergency-net module 140 and/or, more generally, the example wireless device 110A of FIG. 3 may be implemented as any combination of firmware, software, logic and/or hardware. Moreover, the example wireless device 110A may include processor(s), device(s), component (s), circuit(s), interface(s) and/or module(s) in addition to, or instead of, those illustrated in FIG. 3, and/or may include more than one of any or all of the illustrated processor(s), device(s), component(s), circuit(s), interface(s) and/or module(s).

FIGS. 5, 6A, 6B, 7 and 8 illustrates example machine accessible instructions that may be executed to implement any or all of the example emergency-net modules 140 and/or the example MACs 320 of FIGS. 1-4. The example machine accessible instructions of FIGS. 5, 6A, 6B, 7 and/or 8 may be carried out by a processor, a controller and/or any other suitable processing device. For example, the example machine accessible instructions of FIGS. 5, 6A, 6B, 7 and/or 8 may be embodied in coded instructions stored on a tangible medium such as a flash memory, a ROM and/or RAM associated with a processor (e.g., the example processor 325 discussed above in connection with FIG. 3). Alternatively, some or all of the example machine accessible instructions of FIGS. 5, 6A, 6B, 7 and/or 8 may be implemented using any combination(s) of ASIC(s), PLD(s), FPLD(s), discrete logic, hardware, firmware, etc. Also, some or all of the example machine accessible instructions of FIGS. 5, 6A, 6B, 7 and/or 8 may be implemented manually or as any combination of any of the foregoing techniques, for example, any combination of firmware, software, discrete logic and/or hardware. Further, persons of ordinary skill in the art will readily appreciate that many other methods of implementing the example operations of FIGS. 5, 6A, 6B, 7 and/or 8 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 5, 6A, 6B, 7 and/or 8 may be carried out sequentially and/or carried out in parallel by, for example, separate processing threads, processors, devices, discrete logic, circuits, etc.

Figure 5:
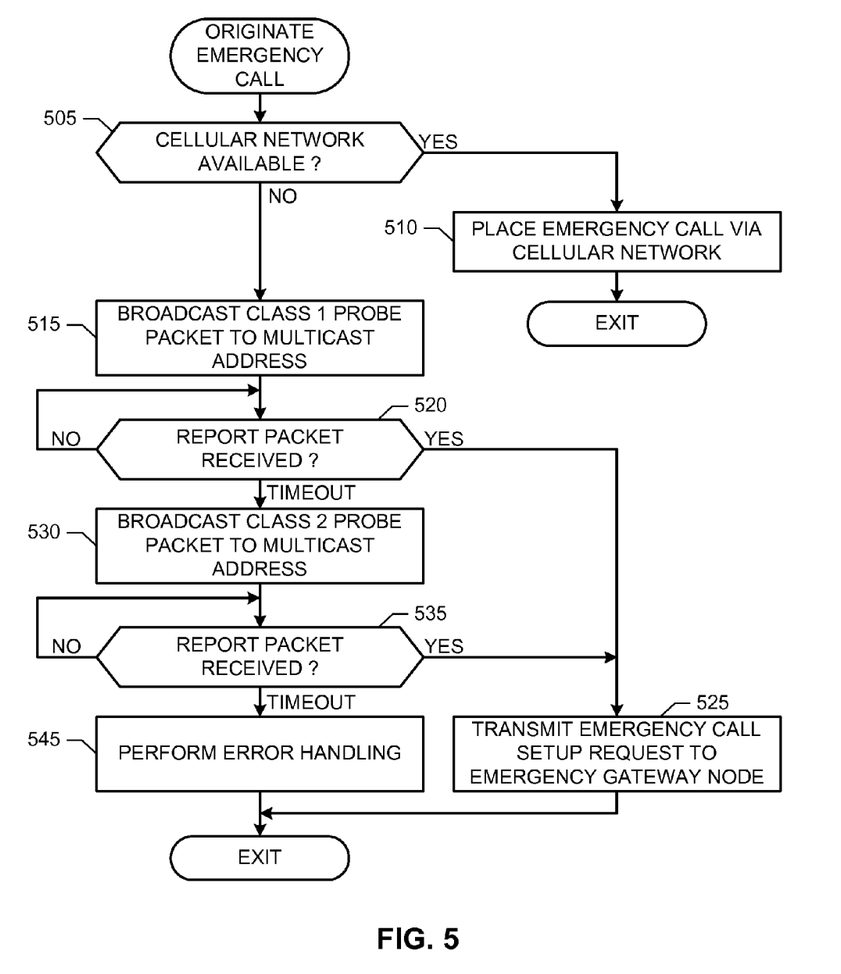
FIGS. 5, 6A, 6B, 7 and 8 are flowcharts representative of example machine accessible instructions that may be executed by, for example, a processor to implement any or all of the example emergency-net modules, the media access controllers and/or, more generally, any or all of the example wireless communication devices of FIGS. 1-4.

The example machine accessible instructions of FIG. 5 begin when a user of a wireless device (e.g., the example wireless device 110A of FIG. 1) initiates a communication session to an emergency call center (e.g., the example emergency call center 125). An emergency-net module (e.g., the example emergency call origination detector 205 of FIG. 2) determines whether the wireless device is currently able to communicate with and/or establish a communication session via a cellular network (e.g., the example PLMN 115) (block 505). If the wireless device is able to communicate with and/or establish a communication session via the cellular network (block 505), the wireless device initiates the communication session via the cellular network (block 510). Control then exits from the example machine accessible instructions of FIG. 5.

If the wireless device is not able to communicate with and/or is not able to establish the communication session via the cellular network (e.g., the cellular network is unavailable and/or the communication session initiation fails) (block 510), the emergency-net module (e.g., the example probe packet module 210 of FIG. 2) broadcasts a class 1 probe packet containing a unique search identifier to a reserved multicast MAC address (block 515). The emergency-net module (e.g., the example report packet module 215) then waits to receive a report packet (block 520). If a report packet that contains the unique search identifier is received within a predetermined time period (block 520), the emergency-net module (e.g., the example emergency call setup module 225) transmits a call setup request using the unicast MAC address received in the report packet (block 525). Control then exits from the example machine accessible instructions of FIG. 5.

Returning to block 520, if a timeout occurs while waiting to receive a report packet (block 520), the probe packet module broadcasts a class 2 probe packet containing the unique search identifier to the reserved multicast MAC address (block 530), and waits to receive a report packet (block 535). If a report packet is received that contains the unique search identifier (block 535), the emergency-net module (e.g., the example emergency call setup module 225) transmits a call setup request using the unicast MAC address received in the report packet (block 525). Control then exits from the example machine accessible instructions of FIG. 5.

Returning to block 535, if a timeout occurs while waiting to receive a report packet in response to the class 1 probe packet (block 535), the wireless device performs error handling (block 545). For example, the wireless device displays a notification that the wireless device can not currently be communicatively coupled to an emergency call center. Control then exits from the example machine accessible instructions of FIG. 5.

Figure 6A:
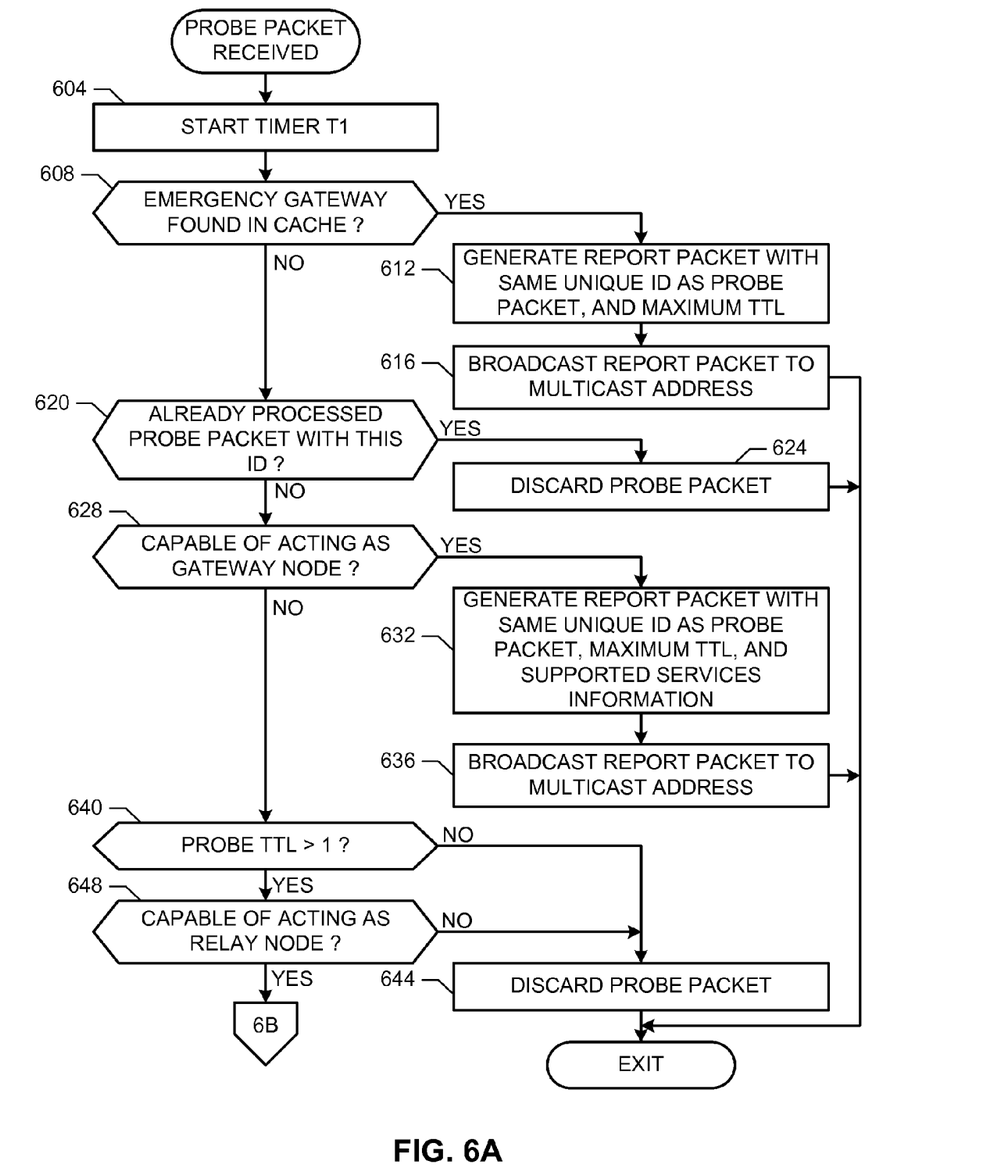
Figure 6B:
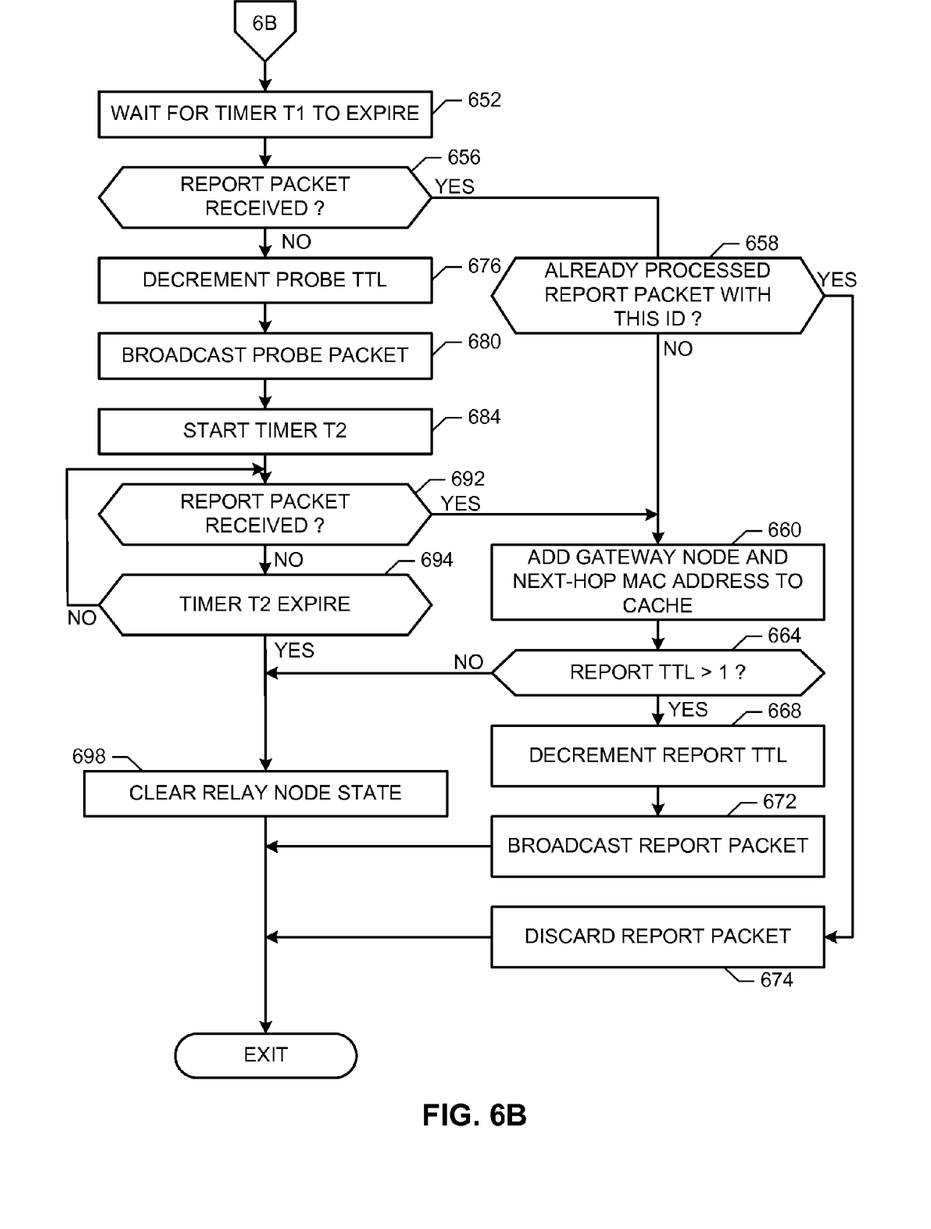

The example machine accessible instructions of FIGS. 6A and 6B begin when a wireless device (e.g., any or all of the example wireless devices 110A-F of FIG. 1) receive a probe packet. The wireless device (e.g., the example probe packet module 210 of FIG. 2) starts a timer with duration T1 (block 604). If an active entry is found in a gateway cache (e.g., the example gateway cache 220 of FIG. 2), an emergency-net module (e.g., the example report packet module 215) generates a report packet containing the unique search identifier received in the probe packet and the maximum TTL (block 612), and broadcasts the generated report packet to the reserved multicast MAC address (block 616). Control then exits from the example machine accessible instructions of FIGS. 6A and 6B.

If an active entry is not found in the gateway cache (block 608) and if the wireless device has already processed a probe packet with this unique search identifier (block 620), the emergency-net module discards the probe packet (block 624). Control then exits from the example machine accessible instructions of FIGS. 6A and 6B.

Returning to block 620, if the wireless node has not already processed a probe packet with this unique identifier (block 620), the probe packet module determines whether the node is capable of acting as a gateway node (block 628). If the node is capable of acting as a gateway node (block 628), the emergency-net module (e.g., the example report packet module 215) generates a report packet containing the unique search identifier received in the probe packet, the maximum TTL and a list of services supported by the node (block 632). The report packet module then broadcasts the generated report packet to the reserved multicast MAC address (block 636). Control then exits from the example machine accessible instructions of FIGS. 6A and 6B.

Returning to block 628, if the node is not capable of acting as a gateway node (block 628), and if the TTL value contained in the received probe packet is not greater than one (block 640), the emergency-net module discards the probe packet (block 644). Control then exits from the example machine accessible instructions of FIGS. 6A and 6B.

If the TTL value is greater than one (block 640), and the node is not capable of acting as a relay node (block 648), the emergency-net module discards the probe packet (block 644). Control then exits from the example machine accessible instructions of FIGS. 6A and 6B.

If the TTL value of the received probe packet is greater than one (block 640), and the node is capable of acting as a relay node (block 648), the emergency-net module (e.g., the example probe packet module 210) waits for the timer with duration T1 to expire (block 652 of FIG. 6B). If a report packet was received before the timer expired (block 656), the emergency-net module determines if a report packet with this unique search identifier has been processed (block 658). If a report packet for this unique identifier has not been processed (block 658), the emergency-net module (e.g., the example report packet module 215) adds the information received in the report packet to the gateway cache (block 660). If the TTL of the received report packet is greater than one (block 664), the report packet module decrements the TTL of the report packet (block 668) and broadcasts the modified report packet to the multicast MAC address (block 672). Control then exits from the example machine accessible instructions of FIGS. 6A and 6B. If the TTL of the report packet is not greater than one (block 664), control proceeds to block 698 to clear the relay state of the node.

Returning to block 658, if a report packet for this unique search identifier has already been processed (block 658), the report packet module discards the report packet (block 674). Control then exits from the example machine accessible instructions of FIGS. 6A and 6B.

Returning to block 656, if a report packet was not received (block 656), the packet probe module decrements the TTL of the received probe packet (block 676), broadcasts the modified probe packet to the reserved multicast MAC address (block 680) and starts a timer with duration T2 (block 684). If a report packet is received prior to the T2 timer expiring (blocks 692 and 694), control proceeds to block 660 to update the gateway cache.

If a report packet is not received before the T2 time expires (blocks 692 and 694), the probe packet module clears the relay state of the node (block 698). Control then exits from the example machine accessible instructions of FIGS. 6A and 6B.

In the example machine accessible instructions of FIGS. 6A and 6B, a gateway cache only includes and/or stores one gateway node entry, and a node only processes a first report packet for each unique search identifier. Additionally or alternatively, if a node receives more than one report packet corresponding to a search identifier, the node may store multiple entries in its gateway cache (e.g., together with one or more values, such as signal strength, number of hops, etc. that may be used to pick which entry is preferable). In such an alternative implementation, a report packet may include a path vector that represents the MAC addresses of each traversed node to avoid loops.

Figure 7:
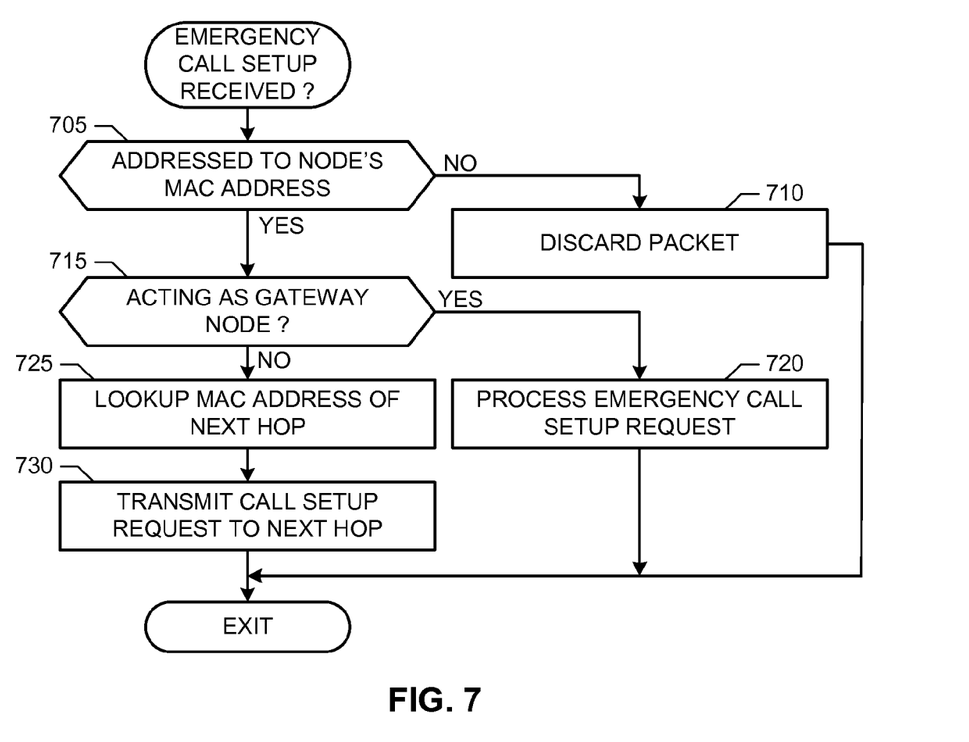

The example machine accessible instructions of FIG. 7 begin when a wireless node receives a call setup request message. If the call setup request message is not addressed to the unicast MAC address of the wireless node (block 705), the wireless node (e.g., the example emergency call setup module 225 of FIG. 2) discards the setup request message (block 710). Control then exits from the example machine accessible instructions of FIG. 7.

If the call setup request message is address to the unicast MAC address of the node (block 705), the emergency call setup module determines whether the node is acting as a gateway node (block 715). If the node is acting as a gateway node (block 715), the wireless device processes the call setup request message (block 720). Control then exits from the example machine accessible instructions of FIG. 7.

If the node is not acting as a gateway node (block 715), the emergency call setup module looks up the unicast MAC address of the next hop (block 725) and forwards the call setup request to the unicast MAC address of the next hop (block 730). Control then exits from the example machine accessible instructions of FIG. 7.

Figure 8:
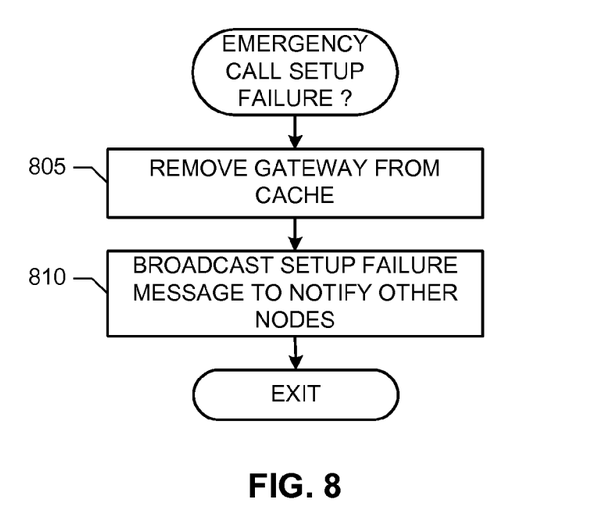

The example machine accessible instructions of FIG. 8 begin when a wireless node receives an emergency call setup failure message. An emergency-net module at the wireless node (e.g., the example emergency call setup module 225 of FIG. 2) removes the cache entry associated with the failed setup (block 805). The emergency-net module (e.g., the example report packet module 215) broadcasts the failure message (block 810). Control then exits from the example machine accessible instructions of FIG. 8.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    querying a gateway node cache in response to a first broadcast probe received at a first node of a wireless Internet-based network;
    when the gateway node cache identifies a first gateway node, selectively sending a first response to nodes that participated in a search flood associated with the first broadcast probe;
    determining whether the first node is capable to act as a second gateway node; and
    broadcasting a second response when the gateway node cache does not identify the first gateway node and the first node is capable to act as the second gateway node.

2. A method as defined in claim 1, wherein the second response indicates a communication service supported by the first node.

3. A method comprising:
    querying a gateway node cache in response to a first broadcast probe received at a first node of a wireless Internet-based network;
    when the gateway node cache identifies a first gateway node, selectively sending a first response to nodes that participated in a search flood associated with the first broadcast probe;
    receiving a report packet comprising a next-hop media access control address and a gateway node identifier;
    adding the media access control address and the gateway node identifier to the gateway node cache; and
    broadcasting a second report packet comprising a second media access control address of the first node and the gateway node identifier.

4. A method as defined in claim 3, wherein a gateway node comprising the gateway node cache is communicatively coupled to the wireless Internet-based network and at least one of a public switched telephone network or a public land mobile network.

5. A machine accessible storage device comprising instructions that, when executed, cause a machine to perform a method comprising:
    querying a gateway node cache in response to a first broadcast probe received at a first node of a wireless Internet-based network;
    when the gateway node cache identifies a first gateway node, selectively sending a first response to nodes that participated in a search flood associated with the first broadcast probe;
    determining whether the first node is capable to act as a second gateway node; and
    broadcasting a second response when the gateway node cache does not identify the first gateway node and the first node is capable to act as the second gateway node.

6. A machine accessible storage device as defined in claim 5, wherein the second response indicates a communication service supported by the node.

7. A machine accessible storage device comprising instructions that, when executed, cause a machine to perform a method comprising:
    querying a gateway node cache in response to a first broadcast probe received at a first node of a wireless Internet-based network;
    when the gateway node cache identifies a first gateway node, selectively sending a first response to nodes that participated in a search flood associated with the first broadcast probe;
    receiving a report packet comprising a next-hop media access control address and a gateway node identifier;
    adding the media access control address and the gateway node identifier to the gateway node cache; and
    broadcasting a second report packet comprising a second media access control address of the first node and the gateway node identifier.

8. A machine accessible storage device as defined in claim 7, wherein a gateway node comprising the gateway node cache is communicatively coupled to the wireless Internet-based network and at least one of a public switched telephone network or a public land mobile network.

9. A method comprising:
    receiving a call setup request from a first node of an Internet-based network at a second node of the Internet-based network;
    comparing a first media access control address of the call setup request with a second media access control address of the second node;
    querying a cache to obtain a third media access control address when the first media access control address matches the second media access control address; and
    transmitting, from the second node, a second call setup request to the third media access control address.

10. A method as defined in claim 9, further comprising discarding the first call setup request when the first media access control address does not match the second media access control address.

11. A method as defined in claim 9, further comprising processing the call setup request when the first media access control address matches the second media access control address and the second node is a gateway node.

12. A method as defined in claim 11, wherein the gateway node is to facilitate a communication session between the first node and the emergency call center.

13. A method as defined in claim 9, wherein the call setup request is directed to an emergency call center.

14. A machine accessible storage device comprising instructions that, when executed, cause a machine to perform a method comprising:
 comparing a first media access control address of a call setup request received from a first node of an Internet-based network with a second media access control address of a second node of the Internet-based network;
 querying a cache to obtain a third media access control address when the first media access control address matches the second media access control address; and
 transmitting, from the second node, a second call setup request to the third media access control address.

15. A machine accessible storage device as defined in claim 14, wherein the method further comprises discarding the first call setup request when the first media access control address does not match the second media access control address.

16. A machine accessible storage device as defined in claim 14, wherein the method further comprises processing the call setup request when the first media access control address matches the second media access control address and the second node is a gateway node.

17. A machine accessible storage device as defined in claim 16, wherein the gateway node is to facilitate a communication session between the first node and the emergency call center.

18. A machine accessible storage device as defined in claim 14, wherein the call setup request is directed to an emergency call center.

* * * * *